Oct. 24, 1939.                C. S. BRAGG                2,177,447
                        CLUTCH CONTROL MECHANISM
                      Original Filed April 17, 1935
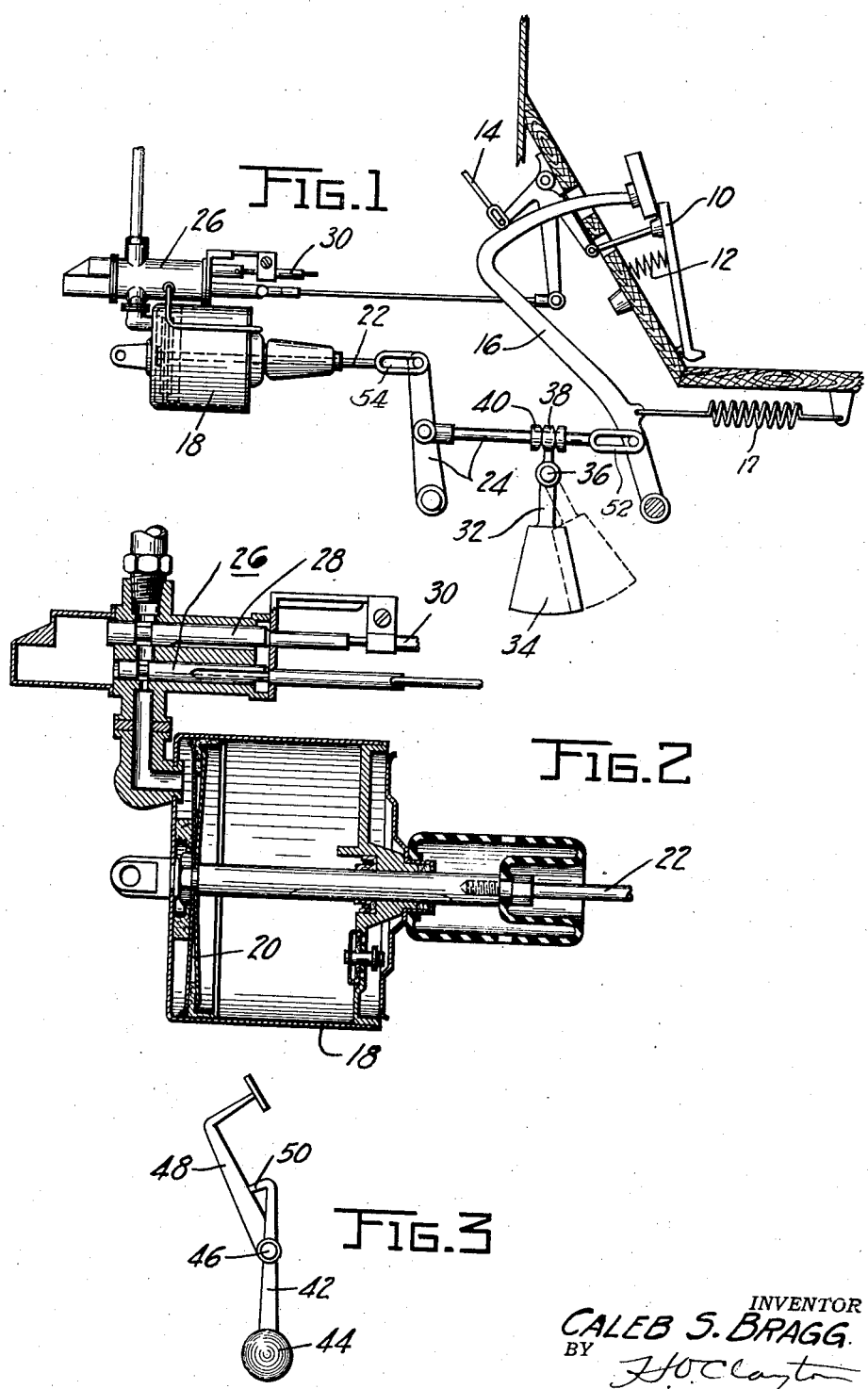
INVENTOR
CALEB S. BRAGG.
BY
ATTORNEY Patented Oct. 24, 1939

2,177,447

UNITED STATES PATENT OFFICE 2,177,447

CLUTCH CONTROL MECHANISM

Caleb S. Bragg, Palm Beach, Fla., assignor to Bragg-Kliesrath Corporation, South Bend, Ind., a corporation of New York Original application April 17, 1935, Serial No. 16,748, now Patent No. 2,104,731, dated January 11, 1938. Divided and this application October 8, 1937, Serial No. 167,945

2 Claims. (Cl. 192—.01)

This invention relates to power means for operating the clutch of an automotive vehicle.

The principal object of the invention is to provide a clutch operator that is automatically operable with an operation of the accelerator, thus relieving the driver of all conscious control of the clutch.

A further object of the invention is to provide automatically operable means operable, when and if the clutch is about to be engaged too severely, to counteract the effect of the power means in controlling the engagement of the clutch. To this end there is provided a weight operable, by virtue of its inertia, to control the loading of the clutch plates by bearing upon the clutch operating linkage in a direction tending to disengage the clutch.

In the broadest sense, the invention contemplates the provision of inertia operated means for controlling the engagement of the clutch, whether the latter be power or manually operated.

Other objects of the invention and desirable details of construction and combinations of parts will become apparent from the following detailed description of certain embodiments of the invention, taken in conjunction with the accompanying drawing illustrating said embodiments, in which:

Figure 1 is a diagrammatic view disclosing a power means for disengaging the clutch, in combination with the inertia means, constituting the essence of my invention, for modifying the clutch engaging operation of the power means;

Figure 2 is a sectional view disclosing the details of the clutch operating motor and the motor controlling valve of the mechanism of Figure 1; and Figure 3 discloses another embodiment of inertia operated means for controlling the engagement of the clutch.

Referring now to the structure disclosed in Figure 1, there is provided a throttle controlling accelerator 10 returned to its off position by a spring 12 and connected to the throttle by a link 14. There is also disclosed a conventional manually operated clutch throw-out lever 16, the latter being actuated to control a conventional clutch by a power mechanism cooperating with both the clutch and the engine in a manner to be described in detail hereinafter. The lever 16 is biased to its clutch engaged position by a return spring 17.

The power unit comprises a fluid operated motor including a cylinder or casing 18 rigidly secured to the engine or other convenient mounting rigidly secured to the chassis. A piston 20 of the motor is provided with the usual connecting rod 22, the latter, together with linkage 24, interconnecting the piston and the clutch throw-out lever 16.

The operation of the servomotor is controlled by a three-way valve mechanism 26 mounted thereon, as clearly disclosed in Figure 2. A two-way valve 28, operable from the dash by a Bowden control 30, serves to cut the power means out of operation at the will of the driver.

Upon release of the accelerator, the valve 26 is operated to interconnect the clutch operating motor with the intake manifold, to thus evacuate the motor and effect a disengagement of the clutch. Depression of the accelerator serves to again operate the valve to vent the clutch motor to atmosphere and initiate an engagement of the clutch. No claim is made to the above briefly described power mechanism for operating the clutch, inasmuch as the same is disclosed and claimed in numerous patents in this art, such as Patent No. 1,470,272, granted October 9, 1923, and Patent No. 2,051,894, granted August 25, 1936.

The essence of the invention, however, lies in the means for controlling the clutch engaging operation of the clutch motor, thus providing a safety feature in that, in effecting the engagement of the clutch plate, the loading is controlled by means tending to limit the loading to a factor above which the acceleraton of the vehicle would be excessive.

As disclosed in Figure 1, a lever member 32, weighted at its end by a relatively heavy bob 34, is pivoted to a pin 36, fixedly secured to the chassis. The lever member is preferably bifurcated at 38 to surround the link 24 and contact a stop 40 secured thereto. Should the clutch be engaged too severely, the acceleration of the car will swing the bob to the dotted-line position shown in figure, the furcations thus contacting the stop 40 and creating a force, proportional to the acceleration, counteracting the force of the clutch spring in engaging the clutch. The lever 16 may be connected to the linkage 24 by a lost motion connection 52 to provide a mechanism permitting a manual disengagement of the clutch without affecting the power means: furthermore, the linkage 24 may be connected to the rod 22 by a lost motion connection 54 to provide a mechanism permitting an operation of the above-described bob 34 without affecting said power means.

Referring to the modification of Figure 3, there is provided a lever 42 having a relatively heavy bob 44 at its end, the lever being fulcrumed upon a conventional clutch shaft 46, to which is operatively connected a conventional clutch pedal 48. The upper end of the lever is provided with a stop 50 adapted to contact the pedal 48, and should the acceleration of the car, as a result of faulty clutch engagement, be excessive, the lever will move or tend to move counterclockwise and oppose the clutch engaging movement of the clutch pedal.

The invention heretofore described is disclosed in my copending application Serial No. 16,748, filed April 17, 1935, this application constituting a division thereof.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a clutch pedal, means contactable with said pedal and adapted to oppose the engaging movement thereof, and an inertia operated member connected to said means.

2. In an automotive vehicle provided with a clutch pedal, a lever member weighted at one end and contactable at its other end with said pedal so as to oppose the clutch engaging movement of the pedal during the acceleration of the vehicle.

CALEB S. BRAGG.